March 23, 1937.  C. A. ROEDER  2,074,618
PUMPING SYSTEM
Filed Aug. 1, 1934  2 Sheets-Sheet 1
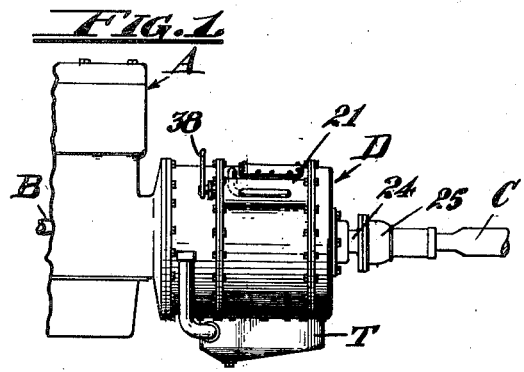
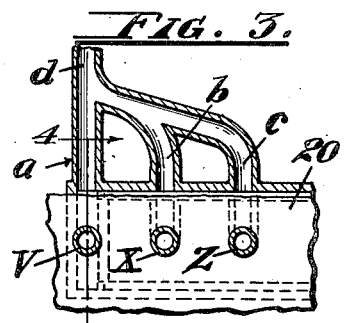
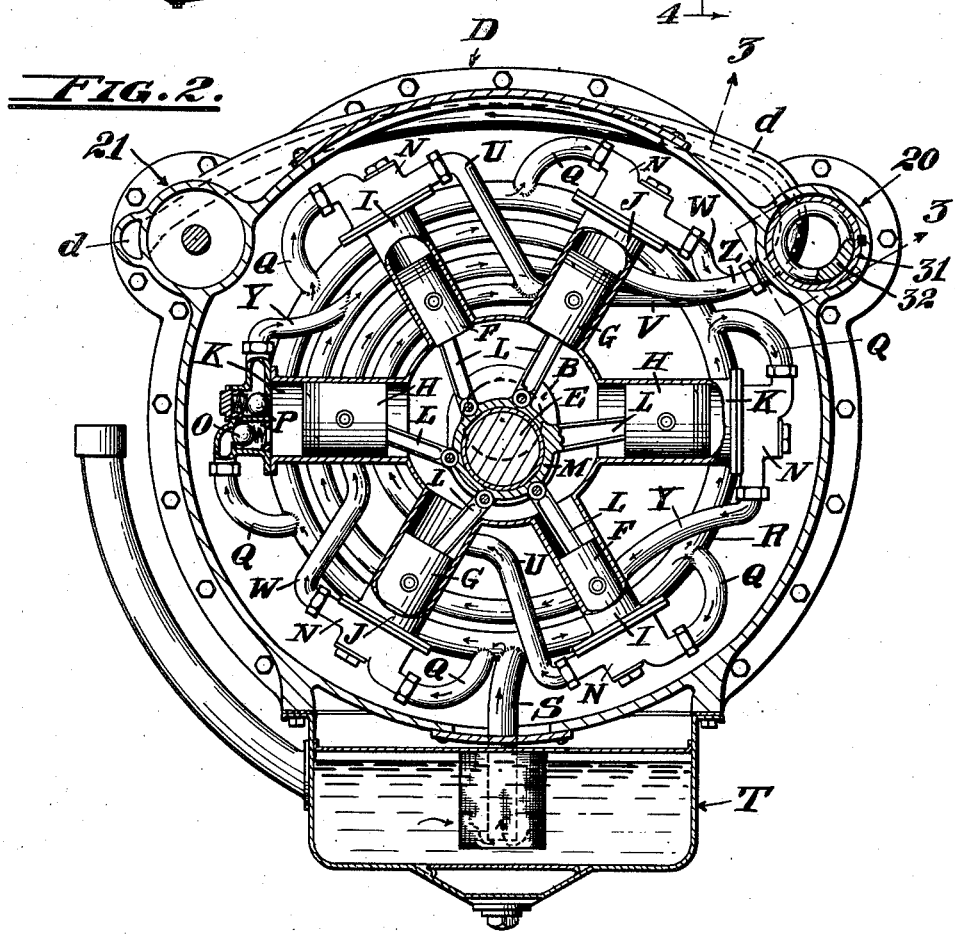
Inventor:
Clyde A. Roeder
By
R. S. Brim
Atty.

March 23, 1937. C. A. ROEDER 2,074,618
PUMPING SYSTEM
Filed Aug. 1, 1934 2 Sheets-Sheet 2
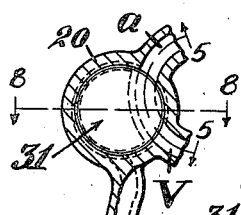
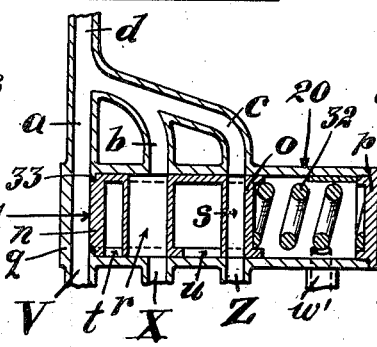
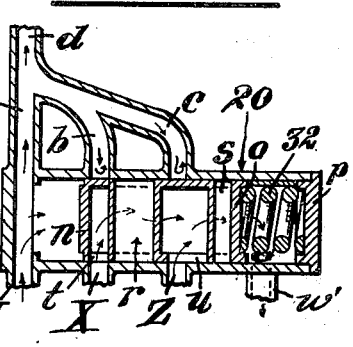
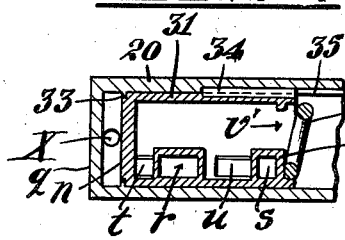
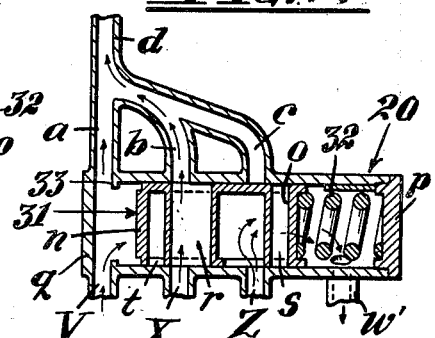
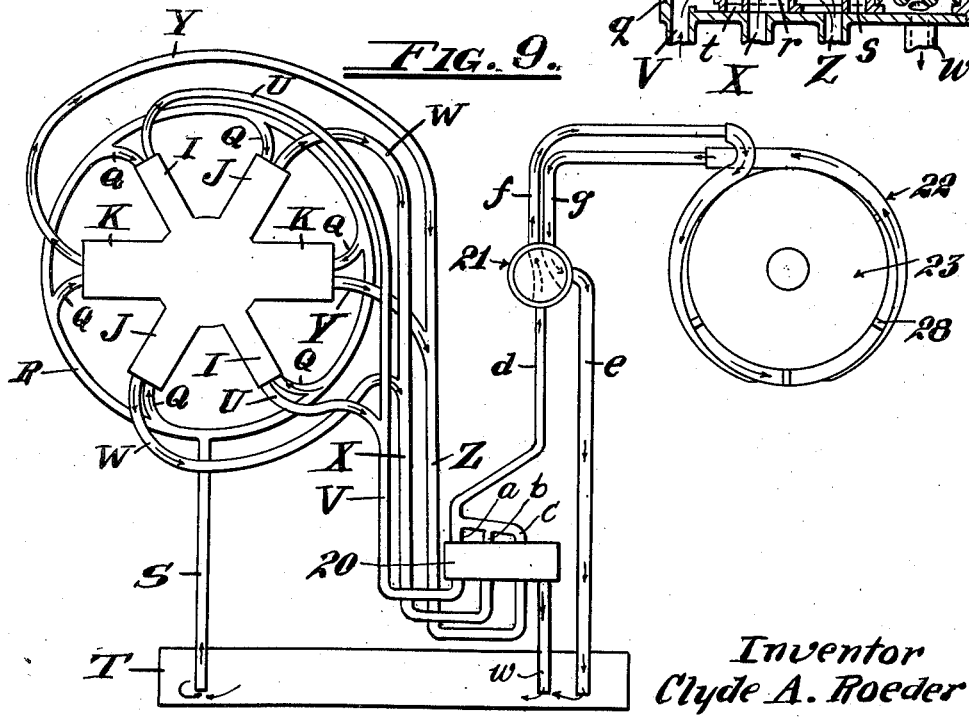
Inventor
Clyde A. Roeder
By R. S. Berry
Atty.

Patented Mar. 23, 1937

2,074,618

UNITED STATES PATENT OFFICE 2,074,618

PUMPING SYSTEM

Clyde A. Roeder, Omaha, Nebr.

Application August 1, 1934, Serial No. 737,903

1 Claim. (Cl. 103—11)

This invention relates to a pumping mechanism and has as its primary object the provision of pumping mechanism wherein a series of different fluid pressures and volumes of liquid flow may be created by the employment of a plurality of pumps of different capacities together with means automatically placing the pumps successively in operation from the pump of lower capacity to a higher capacity and vice versa.

With the foregoing object in view together with such other objects and advantages as may subsequently appear the invention resides in the parts and in the combination, construction and arrangement of parts hereinafter described and claimed and illustrated by way of example in the accompanying drawings in which:

Fig. 1 is a view in side elevation of the transmission mechanism showing it as applied:

Fig. 2 is a view in vertical section taken on the line 2—2 of Fig. 1 as seen in the direction indicated by the arrows:

Fig. 3 is a detail in section and elevation taken on the line 3—3 of Fig. 2:

Fig. 4 is a detail in cross section taken on the 4—4 of Fig. 3 as seen in the direction indicated by the arrows showing an automatic change speed valve in end elevation as disposed in its normal high speed position:

Fig. 5 is a view in vertical section taken on the line 5—5 of Fig. 4, showing the valve in its normal high speed position:

Fig. 6 is a view similar to Fig. 5 showing the change speed control valve in its fully advanced low speed position:

Fig. 7 is a view in similarity to Figs. 5 and 6 showing the valve in its intermediate or second speed position:

Fig. 8 is a detail in horizontal section taken on the line 8—8 of Fig. 4:

Fig. 9 is a diagrammatic view of the transmission mechanism depicting the mode of operation thereof.

Referring to the drawings more specifically A indicates generally an internal combustion engine fitted with the usual drive or crank shaft B, C designates a driven shaft and D denotes generally a hydraulic transmission housing attached to the engine A and enclosing change speed mechanism for driving the shaft C at various speeds and ratios of power in either direction from the engine shaft B, and also for placing the driven shaft C out of operative relation with respect to the engine shaft B.

Arranged in the housing D is a crank E connecting with the engine shaft B as indicated in Fig. 2, and which crank is connected to a series of pistons F—F, G—G and H—H mounted for reciprocal movement in pump cylinders I—I, J—J and K—K respectively; the pistons being equipped with piston rods L connecting with a sleeve M carried by the crank E.

In carrying out the invention the pump pistons F—F are of smaller diameter than the pistons G—G and the latter are of a smaller diameter than the pistons H—H with the pistons of each pair of corresponding diameter thus providing a plurality of pairs of pumps of different capacities with the pumps of each pair arranged on diametrically opposite sides of the axis of the crank E.

The pump cylinders extend radially around the axis of rotation of the crank E and have their outer ends equipped with heads N constituting housings for intake valves O and outlet valves P, and which valves are here shown in Fig. 2 as of the spring pressed ball type.

Leading from each cylinder head N and communicating with the chamber of the intake valve O therein is a conduit Q which connects at its outer end with an annular conduit R disposed alongside the pump cylinders concentric with the axis of the crank E, and from the lower portion of which annular conduit R extends a feed pipe S which projects downwardly and opens to a fluid containing reservoir T carried on the under side of the housing D and separated from the interior of the latter, the reservoir T being filled with a liquid of the character commonly employed in hydraulic transmissions.

Connecting with the chambers of the outlet valves P of the cylinder heads N on the pump cylinders I—I are conduits U connecting with a single conduit V. Leading from the chambers of the outlet valves in the heads of the cylinders J—J are conduits W connecting with a conduit X. Leading from the chambers of the outlet valves of the cylinders K—K are conduits Y connecting with a conduit Z. The conduits V, X and Z lead to a valve housing 20, as particularly shown in Figs. 3 and 9.

Leading from the valve housing 20 from points opposite the connection therewith the conduits V, X and Z are conduits a, b and c connecting with a discharge conduit d leading to a valve housing 21 of a direction control valve which latter also serves as a clutch. From one side of the housing 21 leads a conduit e connecting with the reservoir T as particularly shown in Fig. 9, and from another portion of which valve housing 21 leads a pair of conduits f and g connecting with a rotor housing 22 containing a rotor 23 having radial blades 28 as particularly shown in Fig. 9. The rotor with various loads imposed thereon offers variable resistance to the discharge of liquid from the conduit $d$ and the valve in housing 21 serves as a means of by-passing the liquid from the rotor under minimum resistance. It is obvious that the pumping mechanism may be operated against any other variable resistance.

The valve housing 20 is in the form of a cylinder with which the conduits V, X and Z connect at points in line with the connections therewith of the conduits $a$, $b$ and $c$, with the conduits V, X and Z spaced apart relative to each other and with the conduit V connecting with the housing 20 adjacent one end wall of the latter.

Mounted in the housing 20 for reciprocal movement longitudinally thereof is a hollow cylindrical valve 31 having opposed end walls $n$ and $o$ and interposed between the end wall $o$ and the outer end $p$ of the housing 20 is a spring 32 which acts to normally maintain the valve 31 in an advanced position with the forward end wall $n$ abutting against a flange 33 projecting inwardly from the interior of the housing 20 in spaced relation to the front wall $q$ thereof, as particularly shown in Fig. 11, thus affording a space in the housing 20 in front of the forward end of the valve 31 with which the conduits V, and $a$ communicate whereby pressure of liquid delivered to such space may act to retract the valve 31 in opposition to the spring 32.

The valve 31 is held against rotation in the housing 20 by a key 34 on the valve slidably engaging a longitudinal slot 35 in the inner periphery of the housing 20 as shown in Fig. 8.

The valve 31 is formed with a transverse passage $r$ which, when the valve is in its normal forwardmost position, affords a communication between the conduits X and $b$ and which passage $r$ is elongated in the direction of the length of the valve to extend approximately twice the width of the ports at the ends of the conduits X and $b$ so that communication will be accomplished between the conduits X and $b$ when the valve 31 is in a partly retracted or intermediate position, as shown in Fig. 7. The valve 31 is also formed with a transverse passage $s$ the ends of which register with the ports at the ends of the conduits Z and $c$ when the valve is in its forwardmost position, as particularly shown in Fig. 5.

Formed in the cylindrical wall of the valve 31 is a pair of spaced ports $t$ and $u$ arranged so that when the valve is in its fully retracted position as shown in Fig. 6 these ports will be in communication with the conduits X and Z whereby liquid flowing from said conduits will pass into the interior of the valve 31 and be discharged through a port $v'$ in the end wall $o$ thereof into the chamber in the valve housing 20 containing the spring 32 and be discharged from said chamber through a conduit $w'$ leading into the reservoir T. The port $t$ is of a diameter to register with the port at the end of the conduit X while the port $u$ is elongated relative to the diameter of the port at the end of the conduit Z so that the port $u$ will afford a communication with the conduit Z when the valve is in its intermediate position shown in Fig. 7 as well as in its fully retracted position shown in Fig. 6.

In the operation of the invention, rotation of the crank E from the engine crank shaft B effects reciprocation of the pump pistons F, G and H, each of which on its inward movement effects intake of liquid from the tank T into the pump cylinders through the intake valves O, conduits Q, R and S. On outward movement of the pistons the liquid drawn into the several pump cylinders will be discharged through the valves P and through the conduits U, W and Y and then through the conduits V, X and Z, to the valve housing 20. When the valve 31 in the housing 20 is disposed in its normal advanced position shown in Fig. 5 the pumped liquid will flow from conduit V past the front end of the valve 31 to conduit $a$ and from conduit X through passage $r$ to conduit $b$ and from conduit $z$ through passage $s$ to conduit $c$ and be directed from conduits $a$, $b$ and $c$ to conduit $d$. The liquid flowing through conduit $d$ is directed to the valve housing 21 and when the valve in the latter is disposed in its neutral position will be directed to the conduit $e$ leading to the tank T thus permitting circulation of the liquid by the pumps without effecting rotation of the rotor 23; and with a minimum of resistance to the liquid flow through discharge pipe $d$.

When it is desired to impel the rotor to effect driving of the driven shaft C in a forward direction the valve in housing 21 is manually turned to direct the liquid under pressure from the conduit $d$ into the passage $f$ rearwardly of the blades 28 on the rotor 23. If there is little or no resistance to the rotation of the rotor 23 the liquid discharged from all of the pumps will be directed to the conduit $d$ through the conduits V, X and Z and conduits $a$, $b$ and $c$ as before described, but on resistance being offered to rotation of the rotor back pressure will build up in the conduit $d$ and accordingly such pressure will be imposed on the forward end of the valve 31 tending to force the latter rearwardly in opposition to the spring 32. When this resistance to the rotation of the rotor 23 is considerable, the pressure developed in front of the valve 31 may be sufficient to move the valve 31 to its fully retracted position shown in Fig. 6, thus causing the liquid impelled by the pumps J and K through the conduits X and Z to be directed back to the tank T through the conduit $w'$ and its communications through the valve 31 with the conduits X and Z before described. When this occurs the liquid discharged by the small pumps I will be directed through the conduit V and through the conduits $a$ and $d$ to the rotor 23 thus operating the latter at relative low speed with a maximum of power as afforded by the smaller pumps I acting on a reduced volume of the pumped liquid.

As the resistance to rotation of the rotor 23 decreases a consequent reduction of liquid pressure in front of the valve 31 occurs thereby permitting the latter to be advanced under the urge of the spring 32, such for example as shown in Fig. 7 where the valve is disposed in its intermediate or second speed position. When the valve 31 is thus disposed the liquid impelled by the pumps I and J will pass through the conduits V and X to the conduit $d$ and thence to the rotor, while the liquid impelled by the pumps K will flow back to the tank T through the conduit $w'$; the liquid flowing from the conduit V to the conduit $d$ through the valve housing 20 in front of the valve 31 and through conduit $a$ as previously described, while the liquid from the conduit X flows through passage $r$ in the valve 31 and through conduit $b$ to the conduit $d$.

On further decrease of resistance to rotation of the rotor 23 with a corresponding decrease in liquid pressure in front of the valve 31 the latter advances to its forwardmost position under the urge of the spring 32 into the high speed position whereupon the liquid discharged from all of the pumps will be directed to the rotor housing permitting the latter to revolve at high speed; the pumps then delivering a maximum volume of the liquid.

A feature of the invention resides in the provision of a plurality of pumps of different capacities since by this arrangement a wider range of pumping action is attainable than where the series of pumps are of equal capacities. In this instance a pair of small pumps operate when low volume and pressure is desired, and co-operate with pumps of slightly larger capacities when greater volume and pressure is required, and the small and intermediate pumps operate in conjunction with pumps of larger capacity when a maximum of volume and pressure is required.

Another feature of the invention is the automatic valve 31 whereby the change in volume and pressure of the pumped liquid is automatically effected according to demands and as occasioned by variation in resistance offered to the flow of liquid through the discharge pipe $d$.

I claim:

In a pumping apparatus, a pump, a conduit leading from the discharge side of said pump, a valve housing having a space therein with which said conduit communicates, a discharge conduit leading from said space in continuation of said first named conduit, a reciprocable valve in said housing one end of which is exposed at all times to liquid flowing through said space, means for limiting movement of said valve toward said space comprising a flange, spring means normally holding said valve against said flange, a plurality of pumps associated with said first named pump, conduits leading from the discharge outlets of said plurality of pumps, spaced ports in said housing with which said last named conduits communicate, passages in said valve opening to said ports when said valve is in a forwardmost position against said flange, and conduits leading from said valve housing to said discharge conduit communicating with the passages in said valve; said valve being movable away from said flange in opposition to said spring under the urge of fluid pressure in said space, and the passages in said valve being arranged to successively close the conduits leading to the discharge conduit by movement of said valve in opposition to said spring.

CLYDE A. ROEDER.